(No Model.)
C. W. WALTHER.
CHARGING SPOON FOR BRAZING TUBES.
No. 351,545. Patented Oct. 26, 1886.
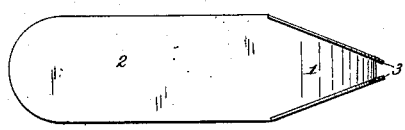
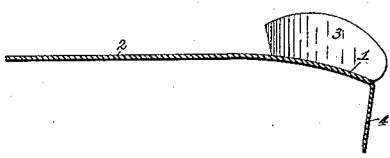
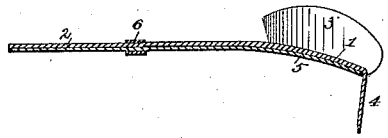
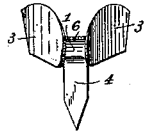
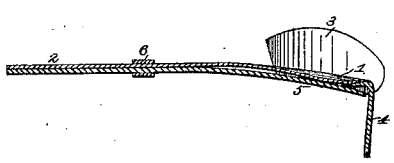
Witnesses.
E. D. Smith
C. E. Ruggles
Inventor -
Charles W. Walther
By A. M. Wooster
Atty.

UNITED STATES PATENT OFFICE.

CHARLES W. WALTHER, OF SEYMOUR, CONNECTICUT.

CHARGING-SPOON FOR BRAZING TUBES.

SPECIFICATION forming part of Letters Patent No. 351,545, dated October 26, 1886.

Application filed September 18, 1886. Serial No. 213,904. (No model.)

*To all whom it may concern:*

Be it known that I, CHARLES W. WALTHER, a citizen of the United States, residing at Seymour, in the county of New Haven and State of Connecticut, have invented certain new and useful Improvements in Charging-Spoons for Brazing Tubing; and I do hereby declare the following to be a full, clear, and exact description of the invention, such as will enable others skilled in the art to which it appertains to make and use the same.

My invention has for its object to simplify and cheapen the operation of brazing metal tubing, and at the same time to greatly improve the appearance of the work. With this end in view I have devised a novel charging-spoon which will hold sufficient solder to braze the longest tubes, which may be used continuously as long as the solder will flow, and will deposit sufficient quantity of solder in a seam to fill it without allowing the solder to run over the surface of the tube and be wasted. The ordinary method of preparing solder for this kind of brazing is to pulverize it and mix it with a variable quantity of borax. Solder prepared in this manner flows perfectly until it becomes set or hardened. I preferably, however, use, in connection with my novel spoon, solder prepared by a novel method which I shall make the subject of a future application, the advantage of my novel method being that solder prepared in that manner does not set or harden like solder prepared in the ordinary manner.

The essential features of my novel charging-spoon are a bottom, converging side pieces or lips, and a depending point or guide, whereby the solder is conducted into the seam.

Figure 1 is a plan view, and Fig. 2 a longitudinal section showing my improved spoon as formed from a single piece of metal; Fig. 3, a longitudinal section, and Fig. 4 a front elevation showing a construction in which the bottom and guide are made in one piece and the side lips are made from another piece of metal, the two parts being held together by a loop or slide; and Fig. 5, a plan view, and Fig. 6, a longitudinal section, of my preferred form, in which the device is made in two parts held together in use by a loop, the bottom is made concave, and the guide is made in a separate piece and brazed to the bottom.

Similar numbers denote the same parts in all the figures.

1 is the bottom; 2, the handle; 3, the side pieces or lips, and 4 the depending point or guide.

As already stated, the whole device may be made in a single piece, although I preferably construct it otherwise. It will be understood that in use the entire wear will be upon the point. I preferably, therefore, make this of hardened steel and braze it to the bottom, as shown in Fig. 6, so that old points may be detached and new ones brazed on when they become worn. In the forms illustrated in Figs. 3 to 6, inclusive, the side pieces or lips are made integral with a supporting-piece, 5, upon which the bottom rests. In use the two parts are laid one above the other, as shown in Figs. 3 and 6, the bottom being drawn back until the point rests against the supporting-piece, and the two parts are held together by a loop or slide, 6.

In Figs. 5 and 6 I have shown the bottom made slightly concave, which is the form I preferably use, as it holds the solder better. In use, the prepared solder is dipped up by the spoon, which is held at an angle, the angle varying of course according to the amount of solder in the spoon. The lips converge, as clearly shown in the drawings, the opening between them being just the width of the point or guide, so that solder can only escape from the spoon by running down the guide. Having dipped up sufficient solder in the spoon, the point is placed in the seam of the pipe, the spoon is tilted sufficiently to allow the solder to run out, and is then drawn rapidly along the seam.

My improved device enables me to thoroughly fill the seam, while at the same time I avoid all waste of solder, as none is deposited except at the seam. I have found no difficulty in making the solder flow freely. Consequently I can draw the spoon along the seam very rapidly, the result being that the operation of brazing is greatly simplified and cheapened. As stated above, any known soldering compound may be used—as, for example, the various mixtures of pulverized solder and borax, which, however, form no portion of my present invention.

It will be understood that the details of construction may be widely varied without departing from the spirit of my invention.

I claim—

1. A charging-spoon consisting, essentially, of a bottom and converging side pieces or lips by which the solder is held, and a depending point or guide by which the solder is conducted to the seam.

2. A charging-tube for brazing tubing, consisting of a bottom, a depending point or guide made separate therefrom and secured thereto, and side pieces or lips by which the solder is held until used.

3. In a charging-spoon, a bottom having a hardened point or guide, 4, a supporting-piece having side pieces, 3, and a loop or slide whereby the parts are held together in use.

4. In a charging-spoon, a concave bottom and a point or guide depending therefrom, in combination with a supporting-piece having side pieces or lips, and a loop or slide whereby the parts are held together.

In testimony whereof I affix my signature in presence of two witnesses.

CHARLES W. WALTHER.

Witnesses:
A. M. WOOSTER,
C. E. RUGGLES.